Dec. 28, 1943.  A. G. LARSON  2,337,756
SLACK ADJUSTER
Filed June 27, 1942

INVENTOR
*Arthur G. Larson*
BY
*A. M. Higgins*
ATTORNEY

Patented Dec. 28, 1943

2,337,756

UNITED STATES PATENT OFFICE 2,337,756

SLACK ADJUSTER

Arthur G. Larson, Forest Hills, Pa., assignor to The Westinghouse Air Brake Company, Wilmerding, Pa., a corporation of Pennsylvania Application June 27, 1942, Serial No. 448,734

7 Claims. (Cl. 74—522)

This invention relates to brakes and more particularly to a slack adjuster device for taking up slack incident to wear of a brake.

The principal object of the invention is to provide an improved slack adjuster device of the above type.

Figure 1:
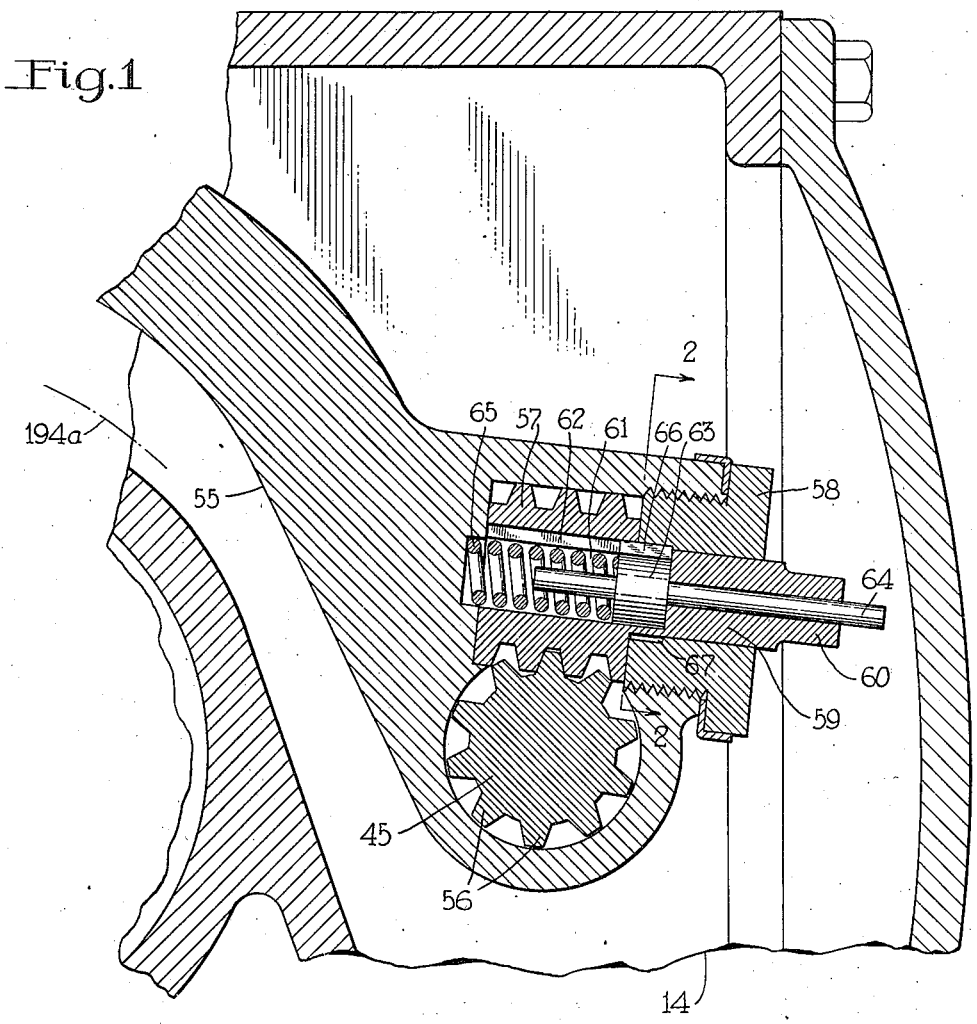
Figure 2:
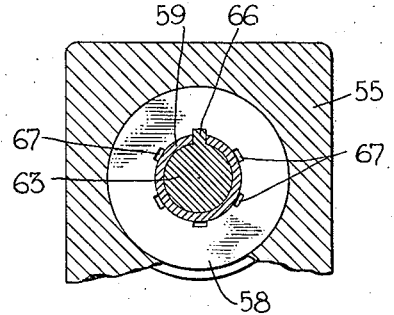

In the accompanying drawing; Fig. 1 is a cross-sectional view of the improved slack adjuster device; and Fig. 2 is a sectional view of the slack adjuster device taken on the line 2—2 in Fig. 1.

For the purpose of illustration, the improvement is shown associated with a portion of a brake device which is fully disclosed in my co-pending application, Serial No. 423,798, filed December 20, 1941, and which comprises a rock shaft 45 for controlling the brake. This shaft is journaled in a brake housing 14 and is operative upon rocking in a counterclockwise direction to brake a rotatable member (not shown) and upon rocking in the opposite direction to release the brake on said member.

A lever 55 is provided for controlling the shaft 45. This lever extends at right angles to the axis of shaft 45 and has one end journaled on said shaft. Within this journaled end the shaft 45 is provided around its periphery with gear teeth 56 meshing with helical teeth provided on a gear 57 which is journaled in a bore in the end of the lever with its axis arranged at right angles to the axis of the brake shaft 45. A cap 58 is secured to the end of the brake lever 55 closing the end of the bore in which the gear 55 is disposed and also engaging the adjacent end face of said gear for holding same against axial movement.

Engagement between the teeth on the brake shaft 45 and gear 57 in lever 55 provides a rigid drive connection between these parts whereby upon counterclockwise movement of lever 55 about the axis of shaft 45, said shaft will be rocked in a corresponding direction to apply the brakes, while upon clockwise movement of the lever and thereby of said shaft, the brake will be released.

In the drawing, the brake lever 55 is shown in a position which may be assumed to be that providing for a release of the brake. A dot and dash line 194a indicates the position which, it may be assumed, the lower portion of the lever will occupy for applying the brake. In other words, to apply and release the brake the lever 55 must be moved in a zone substantially between the position shown and the dot and dash line 194a.

It is desirable that this zone of movement be substantially maintained throughout the life of the brake, which, as well known, comprises brake shoes (not shown) of one type or another which wear away in use, and which after wear, will therefore require a change in the angular position of the brake shaft 45 within the lever 55 to compensate for such wear in order that the zone of movement of the lever 55 will be maintained substantially the same after wear has occurred as when the brake is new. This angular changing of the position of the brake shaft 45 relative to the brake lever 55 is arranged to be effected by rotation of the gear 57 which in turn will rotate the shaft 45 within the end of lever 55. It will be readily apparent that such adjustments of shaft 45 with respect to the lever as required according to wear of the brake will maintain the zone of movement of the brake lever 55 substantially the same throughout the life of the brake.

For turning the gear 57 as above described, said gear is provided on its outer face with an integrally formed axial extension 59 projecting through a suitable bore in cap 58 to beyond the outer face of said cap. The outer end of this extension is provided with a part 60 arranged to receive a wrench (not shown) which may be used thereon for turning the gear 57 and thereby the shaft 45 to compensate for wear of the brake, as above described.

A bore 61 is provided axially through the gear 57 and extends a certain distance into the adjacent portion of the gear extension 59 within the cap 58, and a parallel arranged slot 62 extends through the gear and has one side open to said bore. The bottom of slot 62 is a greater distance from the axis of the gear 57 than the radius of the extension 59 so that in said extension the slot opens through the outer surface thereof.

A plunger 63 is slidably mounted in bore 61 and has a stem 64 extending axially through a suitable bore in the gear extension 59 to a point beyond the outer end of said extension. A spring 65 contained in bore 61 acts on the plunger 63 for urging same to its outer or normal position shown.

The plunger 63 has along one side an outwardly extending tongue or key 66 arranged to slide in slot 62 and to enter, in accordance with the angular position of said plunger with respect to the cap 58, one or another of a plurality of spaced slots 67 provided in the inner end of said cap. When the plunger 61 is pressed by spring 65 against the end of bore 61 within the gear extension 59, a portion of the tongue will be in one or another of the slots 67 while the remainder will be disposed in slot 62 within the gear 57 to thereby secure the gear 57 against turning relative to the cap 58 and for in turn holding the brake shaft 45 against rotation in the end of the brake lever 55 out of an adjusted condition with respect to said lever.

In order to turn the gear 57 and rotate the shaft 45 relative to the brake lever 55 to take up slack or compensate for wear in the brake, it is necessary to first operate pin 64 to move the plunger 63 against the spring 65 to a position wholly within the gear 57. The gear 57 may then be turned to take up slack following which the force on pin 64 may be removed to permit spring 65 to force the plunger 63 back to its normal condition in which the tongue 66 locks the gear to the cap 58 for holding the brake shaft 45 in the adjusted condition.

It will be apparent that the pin 64 may be operated to move the plunger 63 into the gear 57 independently of the wrench employed on the part 60 for turning the gear, or if desired, the wrench may be of such type as to effect such movement of plunger 63 in the act of applying the wrench to the part 60.

Having now described my invention, what I claim as new and desire to secure by Letters Patent, is:

1. In combination, a shaft to be turned, a member for turning said shaft, cooperating gear means operatively connecting said member to said shaft, rotation of said gear means being operative to change the angular relation between said shaft and member, a spring, and positive two-way acting locking means operative by said spring to positively lock said gear means to and against rotation in either direction relative to said member and operative manually to release said gear means for rotation.

2. In combination, a shaft to be turned, a member for turning said shaft, cooperating gear means operatively connecting said member to said shaft, rotation of said gear means being operative to change the angular relation between said shaft and member, a two-way acting positive key and slot means associated with said gear means and member and arranged to interlock for positively securing said gear means against rotation in either direction relative to said member, and a spring acting on said key for actuating same into said slot for interlocking said gear means and member and providing for manual movement of said key out of said slot to permit rotation of said gear means relative to said member.

3. In combination, a shaft to be turned, a member journaled on said shaft, a first gear disposed on said shaft within the journaled portion of said member, a second gear disposed in said member and meshing with said first gear and operative upon rotation to turn said first gear relative to said member, means for turning said second gear, a two-way acting key movable into positive interlocking relation between said second gear and member for securing said second gear against turning in either direction relative to said member, and a spring for actuating said key into said interlocking relation and providing for manual movement of said key out of said interlocking relation.

4. In combination, a shaft to be turned, a member journaled on said shaft, a gear on said shaft within the journaled portion of said member and operative to turn said shaft, a second gear disposed in said member and meshing with the shaft gear and operative upon rotation to turn said shaft gear relative to said member, means for turning said second gear, a plunger slidably mounted in said second gear, a tongue projecting from said plunger and extending parallel to the axis thereof into a slot in said second gear providing for movement of said plunger and tongue axially of said second gear, said member having one or more recesses arranged to receive a portion of said tongue with the remainder in said slot for locking said second gear against turning relative to said shaft gear, and a spring acting on said plunger for actuating same to the position in which said portion of said tongue is in said recess, said spring providing for manual movement of said plunger to a position in which the tongue is out of said recess to thereby provide for rotation of said second gear to turn said shaft gear.

5. In combination, a shaft, a member journaled on said shaft, gear teeth on said shaft within the journaled portion of said member, a gear in said member meshing with said teeth and operative upon rotation to turn said shaft relative to said member, said gear having an axial portion extending through a bore in said member providing for manual turning of said gear and also having an axial bore and a slot extending parallel to and open at one side to said axial bore, a plunger slidably mounted in said axial bore and having a tongue disposed to slide in said slot, said member having around said axial portion of said gear one or more spaced recesses arranged to be aligned with said slot in different angular positions of said gear in said member for receiving a portion of said tongue to lock said gear to said member against turning, a spring in said gear acting on said plunger for urging said tongue into one or another of said recesses, and means projecting from said plunger operative manually against said spring to move said plunger and tongue to a position in which said tongue is out of said recess to provide for turning of said gear in said member.

6. In combination, a shaft, a member journaled on said shaft, gear teeth on said shaft within the journaled portion of said member, said member having an open ended bore, a gear disposed in said bore in meshing relation with said teeth and operative upon turning to turn said shaft relative to said member, a cap closing the open end of said bore and bearing against one end face of said gear securing same against axial movement, said gear having an axial extension extending through said cap and provided beyond said cap with a portion for manual operation to turn said gear, said gear and extension having an axial bore and a slot extending parallel to and open at one side to said bore, said slot in said extension opening through the peripheral surface thereof for registry with one or another of a plurality of spaced recesses provided in said cap around said extension, a plunger disposed to slide in said bore, a key on said plunger projecting into and slidable in said slot and arranged to enter an aligned one of said recesses, means for limiting movement of said plunger and key into said gear extension to an extent providing for a portion of said key being in one of said recesses and the remainder in said slot for thereby locking said gear to said member to hold said gear against rotation, and a spring in said member acting on said plunger to move said key into interlocking relation between said gear and cap and providing for manual movement of said key out of said recess to permit rotation of said gear in said member.

7. In combination, a shaft, a member journaled on said shaft, gear teeth on said shaft within the journaled portion of said member, said member having an open ended bore, a gear disposed in said bore in meshing relation with said teeth and operative upon turning to turn said shaft relative to said member, a cap closing the open end of said bore and bearing against one end face of said gear securing same against axial movement, said gear having an axial extension extending through said cap and providing beyond said cap a portion for manual operation to turn said gear, said gear and extension having an axial bore and a slot extending parallel to and open at one side to said bore, said slot in said extension opening through the peripheral surface thereof for registry with one or another of a plurality of spaced recesses provided in said cap around said extension, a plunger disposed to slide in said bore, a key on said plunger projecting into and slidable in said slot and arranged to enter an aligned one of said recesses, means for limiting movement of said plunger and key into said gear extension to an extent providing for a portion of said key being in one of said recesses and the remainder in said slot for thereby locking said gear to said member to hold said gear against rotation, a spring arranged to actuate said plunger and key into interlocking relation between said gear and cap, and a pin projecting from said plunger through said gear extension to beyond the outer end thereof for operation manually to actuate said plunger to move said key out of said recess to permit rotation of said gear in said member by said gear extension.

ARTHUR G. LARSON.